United States Patent [19]
Jones et al.

[11] Patent Number: 5,905,105
[45] Date of Patent: May 18, 1999

[54] METHOD AND COMPOSITION FOR TREATING METAL SURFACES INCLUDING DISPERSED SILICA

[75] Inventors: Lawrence E. Jones, Reading; José B. Rivera, Philadelphia; Michael D. Wert, Laureldale, all of Pa.

[73] Assignee: Bulk Chemicals, Inc., Reading, Pa.

[21] Appl. No.: 08/714,303

[22] Filed: Sep. 18, 1996

Related U.S. Application Data

[63] Continuation-in-part of application No. 08/112,890, Aug. 27, 1993, abandoned, which is a continuation-in-part of application No. 07/982,874, Nov. 30, 1992, abandoned.

[51] Int. Cl.$^6$ .............................. C08K 3/36; C08K 3/16; C23C 22/34
[52] U.S. Cl. ...................... 524/413; 427/387; 427/388.4; 427/409; 148/247; 148/251
[58] Field of Search .......................... 524/413; 148/247, 148/251; 427/387, 388.4, 409

[56] References Cited

U.S. PATENT DOCUMENTS

| | | |
|---|---|---|
| 3,160,506 | 12/1964 | O'Connor et al. . |
| 3,447,972 | 6/1969 | Wilde, Jr. et al. . |
| 3,506,499 | 4/1970 | Okada et al. . |
| 3,682,713 | 8/1972 | Ries et al. . |
| 3,687,882 | 8/1972 | Bishop . |
| 3,796,582 | 3/1975 | Leahey et al. . |
| 3,846,182 | 11/1974 | Huff et al. . |
| 3,865,617 | 12/1975 | Shimizu et al. . |
| 3,912,548 | 10/1975 | Faigen . |
| 3,960,610 | 6/1976 | Steinbrecher et al. . |
| 3,964,936 | 6/1976 | Das . |
| 4,136,073 | 1/1979 | Muro et al. . |
| 4,148,670 | 4/1979 | Kelly . |
| 4,191,596 | 3/1980 | Dollman et al. . |
| 4,338,233 | 7/1982 | Das et al. . |
| 4,341,558 | 7/1982 | Yashiro et al. . |
| 4,341,877 | 7/1982 | Das et al. . |
| 4,370,177 | 1/1983 | Frelin et al. . |
| 4,385,096 | 5/1983 | Wetzel . |
| 4,422,886 | 12/1983 | Das et al. . |
| 4,473,618 | 9/1984 | Adzima et al. . |
| 4,503,907 | 3/1985 | Tanaka et al. . |
| 4,609,591 | 9/1986 | Pollet et al. . |
| 4,855,363 | 8/1989 | Moteki . |
| 4,921,552 | 5/1990 | Sander et al. . |
| 4,973,359 | 11/1990 | Yamasoe . |
| 5,026,440 | 6/1991 | Finnenthal et al. . |
| 5,064,468 | 11/1991 | Okai et al. . |
| 5,082,698 | 1/1992 | Anderson et al. . |
| 5,085,696 | 2/1992 | Muller et al. . |
| 5,089,064 | 2/1992 | Reghi . |
| 5,158,622 | 10/1992 | Reichgott et al. . |
| 5,281,282 | 1/1994 | Dolan et al. . |
| 5,356,490 | 10/1994 | Dolan et al. . |
| 5,534,082 | 7/1996 | Dollman et al. . |

FOREIGN PATENT DOCUMENTS

| | | |
|---|---|---|
| 0 273 698 | 7/1988 | European Pat. Off. . |
| 27 49 691 | 5/1979 | Germany . |
| 50-144639 | 11/1975 | Japan . |
| 51-075730 | 6/1976 | Japan . |
| 59-225951 | 12/1984 | Japan . |
| 032046 | 2/1994 | Japan . |
| WO 85/05131 | 11/1985 | WIPO . |
| WO 92/07973 | 5/1992 | WIPO . |

OTHER PUBLICATIONS

Exhibit A ("Report to Management") to the Request for Reexamination of U.S. Patent No. 4,191,596 (Reexamination No. 90/001,690).
Supplemental European Search Report dated Feb. 19, 1997.
Product Literature of Air Products and Chemicals, Inc. 1992.
Product Literature of Magnesium Elektron, Inc.

*Primary Examiner*—David Buttner
*Attorney, Agent, or Firm*—Ratner & Prestia

[57] ABSTRACT

A method and composition for treating metal surfaces to improve corrosion resistance and paint adhesion. The composition is a non-corrosive aqueous solution including water, a polymeric compound, an additive, and dispersed silica. In a preferred embodiment, the polymeric compound may be a polymer having a plurality of carboxylic functional groups and a plurality of hydroxyl groups. The polymeric compound may be a bifunctional copolymer or the reaction product of a first polymer having a plurality of carboxylic functional groups (e.g., polyacrylic acid or polymethylvinylmaleic anhydride), and a second polymer having a plurality of hydroxyl groups (e.g., polyvinyl alcohol). The additive is selected from at least one of: (i) an acid of a group IV-B element and a weak base, and (ii) an ammonium salt of a group IV-B compound such as ammonium zirconium carbonate. An exemplary acid of a group IV-B element is fluotitanic acid and an exemplary weak base is ammonium hydroxide. Dispersed silica is added, and any attack of the silica is minimized. The method for improving corrosion resistance and paint adhesion of a metal surface includes contacting the metal surface with a composition as described above and drying the composition in place. Prior to contacting the metal surface with such a composition, the metal surface may be cleaned and rinsed.

12 Claims, No Drawings

5,905,105

METHOD AND COMPOSITION FOR TREATING METAL SURFACES INCLUDING DISPERSED SILICA

CROSS-REFERENCE

This application is a continuation-in-part application of U.S. patent application Ser. No. 08/112,890, filed on Aug. 27, 1993, now abandoned, which is a continuation-in-part application of U.S. patent application Ser. No. 07/982,874, filed on Nov. 30, 1992, now abandoned. U.S. patent application Ser. No. 08/112,890 now ABN is incorporated herein by reference.

FIELD OF THE INVENTION

This invention relates to methods and compositions for treating metal surfaces in order to improve both corrosion resistance and paint adhesion.

BACKGROUND OF THE INVENTION

Known methods of treating metal surfaces to improve adhesion and corrosion resistance of the painted metal surfaces make use of two general definable classes of chemistries. The first class is based on the traditional conversion coating types of chemistries such as zinc phosphate, iron phosphates, chromium chromate, chromium phosphate, etc. The second class is based on more recent developments in the metal pretreatment industry and is characterized by what is now referred to as dried-in-place technology. The traditional conversion coating chemistries require rinsing of the metal substrate to remove applied conversion coating solution. Dried-in-place chemistries require that the applied solutions be dried on the metal substrate to which they are applied. Thus, they are described as dried-in-place, and the class of traditional conversion coatings have as their major drawback the requirement of rinsing, thereby consuming large volumes of water for rinsing.

An advantage of the dried-in-place class of chemicals is therefore obvious in that no rinsing is required. The traditional conversion coating class of pretreatments is characterized by steps or process stages that include:

1) Cleaning—by use of an alkaline or acid cleaning solution;
2) Rinsing—to remove residual cleaning solution;
3) Pretreatment—with the traditional conversion coating solution;
4) Rinsing—to remove the residual pretreatment solution; and, optionally,
5) a final rinse with a corrosion resistance enhancing material such as chromate.

The traditional coatings class of materials are therefore often referred to as five stage conversion coatings.

The second class of materials, the dried-in-place class, are typically referred to as three stage processes since their process steps are typically:

1) Clean—by use of an alkaline or acid cleaning solution;
2) Rinse—to remove residual cleaning solution; and
3) Application of the dried-in-place pretreatment solution.

Another significant disadvantage of the traditional conversion coatings class is the fact that the rinse water is polluted and requires waste treatment. This adds significantly to the cost of the process because significant capital equipment and liability go along with waste handling and treatment.

There are also chemistries in both classes that have other major drawbacks. These particular chemistries are based on chromium compounds, which show toxicological properties and have been determined by the Environmental Protection Agency and by the Occupational Safety and Health Agency as a risk to the environment and health. Moreover, chemistries based on hexavalent chromium are classified as carcinogens by these agencies.

Attempts have been made to produce chromium-free dried-in-place coatings. In the case of aluminum extrusions, successful replacement of chromium was partially accomplished by use of a fluo acid and a carboxylic polymer, as disclosed in U.S. Pat. No. 4,191,596 to Dollman et al. The following formulas applied to clean aluminum extrusions at a concentration of 1% (by weight) of each in water will produce a coating that falls under this technology:

TABLE 1

| Compound 1 | % Wt. | Compound 2 | % Wt. |
| --- | --- | --- | --- |
| Poly(acrylic acid) | 5.0 | Hydrofluozirconic Acid | 7.4 |
| Water | 95.0 | Hydrofluoric Acid | 0.3 |
| | | Water | 92.3 |

Aluminum samples treated by such a composition have acceptable paint adhesive properties in the dry state. The ability to pass other requirements of the American Architectural Manufacturer's Association (AAMA) specifications, however, are somewhat questionable. In some samples tested, the twenty minute cross-hatch boiling water test had variable results, and the 1,000 hour test in 100% relative humidity is inconsistent. In addition, neutral salt spray corrosion resistance is not good.

Another method has been introduced for aluminum extrusions. In this method, the following polymer solution along with a fluo acid is applied to an aluminum surface:

TABLE 2

| Compound | % Wt. |
| --- | --- |
| Poly(acrylic acid) | 3.75 |
| Ammonium Bifluoride | 0.10 |
| Fluosurfactant | 0.04 |
| Water | 96.11 |

Although this method does not require chromium, it does require different process steps and requires an increase in the number of process steps. Comparing this method with a traditional conversion coating method, the step of treating the metal surface with a conversion coating solution is replaced with an acid cleaning stage, then water rinse, followed by dried-in-place pre-treatment which requires a stainless steel or acid-resistant section. In this method, the following steps are required to treat the metal surface: (1) cleaning the metal surface with an alkaline or acid bath; (2) rinsing the cleaned metal surface with water; (3) cleaning the metal surface with an acid solution; (4) rinsing the metal surface with water; and (5) pretreating the rinsed metal surface with a modified chromium-free solution, such as in Table 2 above. Thus, this method can be referred to as a "five-step, chromium-free, dried-in-place method." As in all methods, these steps are followed by drying and then painting the metal surface.

Nonetheless, there remains a need for a chromium-free coating composition which is capable of improving paint adhesion and corrosion resistance by employing the more convenient, three step dried-in-place method. In addition, there remains a need for such a composition which can improve paint adhesion and corrosion resistance of a variety of metals, not exclusively aluminum and aluminum alloys.

Further, there is a need for a coating composition having a relatively high concentration of constituents to meet application requirements such as some reverse-roll coating systems. Also, from an operational standpoint, a single package system including both the inorganic components and organic components is desirable. Thus, a single package material showing no instability or gelation is desirable.

International Publication No. WO 92/07973 to Reghi discloses a chromium-free corrosion surface treatment which is an aqueous acidic liquid comprising water and: (A) fluozirconic acid; (B) dispersed silica; (C) a particular polymer; and (D) 1-propoxy-2-propanol. Because silica can be undesirably attacked in an acidic composition, such as the composition disclosed by this international publication, concentrates that include silica are usually stable for only a few days. Accordingly, there is still a need for a composition for treating metal surfaces which includes silica and is stable for more than a few days.

SUMMARY OF THE INVENTION

The present invention is directed to an aqueous, chromium-free composition for treating metal surfaces to improve corrosion resistance and paint adhesion. The composition includes water, a polymeric compound, an additive, and dispersed silica. The polymeric compound may be any compound as described in U.S. patent application Ser. No. 08/112,390 now abandoned. For example, the polymeric compound may be a polymer having a plurality of carboxylic functional groups and a plurality of hydroxyl groups. Such a polymeric compound may undergo some degree of cross-linking by esterification. The composition also includes an additive selected from the group consisting of at least one of: (i) an acid of a group IV-B element and a weak base; and (ii) an ammonium salt of a group IV-B compound. Finally, the composition also includes inert particulate silica dispersed throughout the solution. With this combination of components, a chromium-free pretreatment including dispersed silica can be achieved which is stable (i.e., the silica undergoes little or no reaction with the components in the bath).

According to a first preferred embodiment of the invention, the additive consists of an ammonium salt which is ammonium zirconium carbonate. In this embodiment, the pH of the solution is at least about 4, and preferably around 8. In a second preferred embodiment of the present invention, the additive consists of a group IV-B element and a weak base, wherein the group IV-B element is fluotitanic acid and the weak base is ammonium hydroxide. In the second embodiment, the preferred pH is from about 3 to about 4.5. The invention may include combinations of the first selected additive (i.e., an ammonium salt of a group IV-B element) and the second selected additive (i.e., an acid of a group IV-B element and a weak base). Typically, when an acid of a group IV-B element and the weak base are added, and the weak base is an ammonium-containing base, there is some reaction to form an ammonium salt of the group IV-B element.

The present invention also includes a method for treating a metal surface to improve paint adhesion and corrosion resistance comprising contacting a metal surface with a composition of the present invention. In this method, the metal surface may first be cleaned, for example by using an alkaline spray to form a cleaned metal surface. Then, the cleaned metal surface may be rinsed with water to form a rinsed metal surface. Then, the rinsed metal surface is contacted with a composition of the present invention including a polymeric compound, an additive, and dispersed silica. Then, the metal surface may be dried by evaporation to form a dried, coated metal surface, and the dried metal surface is painted.

DETAILED DESCRIPTION OF THE INVENTION

Generally, a composition of the present invention includes three components: a polymeric compound, an additive, and dispersed silica. The polymeric compound of the present invention may be any number of known polymeric compounds used as such in compositions for improving the corrosion resistance and paint adhesion of metal surfaces. In a preferred embodiment of the present invention, the "polymeric compound" is the "polymer system" defined in the '890 patent application (incorporated herein by reference), which includes a plurality of carboxylic functional groups and a plurality of hydroxyl functional groups. The polymeric compound may be either a bifunctional copolymer or the reaction product of a first polymer having carboxylic functional groups (—COOH) and a second polymer having hydroxyl functional groups (—OH). In order to obtain the reaction product, or polymeric compound, of the present invention, the two polymers are reacted. The first polymer reactant may be polyacrylic acid or polymethylvinylmaleic anhydride. The second polymer reactant may be polyvinyl alcohol. The resulting polymeric blend is a polymer (which may have undergone some degree of cross-linking) having some free, or unreacted, carboxylic acid groups and hydroxyl groups on the various polymer chains. Another exemplary polymeric blend is polyacrylic acid, which is a component of the composition disclosed in Table 2 of the '890 patent application. This composition is an aqueous solution of polyacrylic acid, ammonium bifluoride, and a fluosurfactant.

The operable grades of polymer reactants vary over a wide range. Experiments have been successful with compositions using polyvinyl alcohols having a medium viscosity grade (molecular weight average of 85,000–146,000) and an ultra-low viscosity grade (molecular weight average of 13,000–23,000). Similarly, successful experiments have been performed with compositions using a first polymer reactant having a molecular weight on the order of 60,000. Although experimentation with different grades of reactant polymers have not been performed, it is believed that all grades of reactant polymers will perform satisfactorily.

According to the present invention, the polymeric compound is augmented with an additive. This additive is selected from the group consisting of at least one of: (i) an acid of a group IV-B element and a weak base; and (ii) an ammonium salt of a group IV-B compound. Either one of these components (i) and (ii) may be selected as the sole additive or combinations of the two may be used. Typically, when the weak base is a ammonium-containing base such as ammonium hydroxide, there is some reaction with the ammonium hydroxide and the acid of a group IV-B element to form the ammonium salt of a group IV-B compound.

Exemplary acids of group IV-B elements include fluotitanic acid, fluozirconic acid, and fluohafnic acid. Exemplary weak bases include ammonium hydroxide, cyclo hexylamine, and mono ethanolamine. Preferably, in one embodiment of the present invention, the additive consists of fluotitanic acid and ammonium hydroxide. In this embodiment, although the pH can be as low as about 3 (and may be as high as approximately 4.5), there is no attack of the silica solids because the weak base preferentially reacts with the acid of the group IV-B element, thereby avoiding any reaction between the acid and the silica. Accordingly, the solution including dispersed silica remains stable.

In another embodiment, an ammonium zirconium salt is added directly as the additive. The group IV-B salt may be zirconium carbonate or basic zirconium carbonate, and the ammonium zirconium salt may be ammonium zirconium carbonate or ammonium zirconyl carbonate, but preferably is ammonium zirconium carbonate. An ammonium zirconium carbonate solution sold by Magnesium Elektron Inc. under the trademark BACOTE 20, having a working empirical formula of $(NH_4)_2[Zr(OH)_2(CO_3)_2]+nH_2O$, was used in several tests. In this embodiment, the pH of the resulting solution is typically about 8 (although the pH can be as low as 4), so that no attack of the dispersed silica is likely.

The relative amounts of the polymeric compound and the additive can vary over a wide range. For example, the polymeric compound can vary from about 1 gram/liter to about 20 grams/liter (preferably from about 3 grams/liter to about 10 grams/liter), and the additive can vary from about 1 gram/liter to about 30 grams/liter (preferably from about 3 grams/liter to about 15 grams/liter). The ammonium salt of a group IV-B compound should be added in an amount sufficient to raise the pH to above 4. If the additive is an acid of a group IV-B element and a weak base, the weak base should be added in an amount sufficient to neutralize the acidity of the group IV-B element.

The specific inert silica used can be any known silica particulate having a wide range of sizes suitable for use in a solution which is used to improve paint adhesion and corrosion resistance. As shown in the examples, two types of silica used successfully are those sold under the trademarks CABOSPERSE® by Cabot Company and LUDOX® by DuPont. The size of the particles should be sufficient to produce a stable colloidal dispersion. The particle diameter should be less than 0.5 microns in order to provide for sufficient stability. It has been determined that inert silica is preferably added in an amount from about 40% to about 70% solids, and preferably from about 50% to about 65% solids, calculated on a dry weight basis.

Hyrdrofluoric acid may also be added to the composition.

The methods and compositions of the present invention are capable of treating a wide variety of metals to improve paint adhesion and corrosion resistance. These metals include aluminum and aluminum alloys, zinc and zinc alloys, iron and iron alloys, and combinations thereof Regardless of the particular metal, the method is the same, although the particular compositions may vary slightly with different metals to achieve the best results. Initially, the metal surface is cleaned. The cleaning step can be carried out by any conventional method, such as a conventional alkaline cleaner or an acid cleaner. The cleaning solution may be sprayed onto the metal surface, or the metal surface may be dipped in a bath of the cleaning solution. If the metal surface is heavily soiled, a detergent cleaner additive may be included in the cleaning step.

Next, the cleaned metal surface is rinsed with water to form a rinsed metal surface. This rinsing step removes any excess cleaner or detergent left on the metal surface from the cleaning step.

After the metal surface is rinsed, the rinsed metal surface is treated with an aqueous composition of the present invention. The coating process can be effected by employing any of the coating techniques known in the art. Contact can be effected by spray, immersion or flow coating techniques. The amount of coating should be sufficient to leave from about 3.0 to 40.0 milligrams of the dried coating per each square foot of dried metal surface. By using a solution of higher concentrations (which can be achieved by the addition of ammonia), it is possible to leave this amount of the dried coating with less solution.

As mentioned above, one well known coating technique is reverse roll coating, whereby a sheet of metal is pulled between counter-rotating cylinders, which are rotating against the direction of travel of the sheet being unrolled. The solution is rolled down along these cylinders until it contacts the metal. As the sheet metal is passed between the cylinders in a direction against the direction of rotation of the cylinders, some wiping force is applied to the metal. Another conventional method is known as the quick-dip method, whereby sheet metal is dipped in a solution of the coating composition and is subsequently passed between two rolls to remove the excess.

The process can be operated at a wide range of temperatures. The process has been carried out at temperatures from about 60° F. to 150° F., although there is no reason to believe that temperatures outside of this range will prevent the composition from having the desirable effects. Generally, a slight change in the temperature will not necessitate substantial alteration of the treating time, or concentrations or ratios of reactants.

The time of treatment of a metal surface with the aqueous composition need only be long enough to ensure complete wetting of the surface. The contact time between a substrate and solution should be from approximately less than one second to about one minute.

Following application of the aqueous composition, the surface is subjected to a drying operation. The surface is dried by evaporation, and the temperatures for the drying operation may range from about 60° F. to about 500° F. The length of the drying step will depend upon the temperature utilized. In addition, air may be blown over the surface to enhance the evaporation.

For ferrous alloys, if there is a significant time lapse (e.g. at least one or two minutes) between the application and the drying steps, a small amount of any well-known corrosion inhibiting compound should be added to the solution. Such compounds, including ammonium molybdate and other corrosion inhibiting compounds, provide flash rusting protection. Flash rusting is a particular problem where ferrous alloys are pretreated but are not quickly dried after pretreatment application. The use of these additives has served to inhibit flash rust production until the drying process is completed.

After drying the metal surface, the metal surface is painted or coated with a lacquer. The dried-in-place composition of the present invention serves to adhere the paint or lacquer to the metal surface and minimize corrosion.

In the continuous coating operation, where a coating bath is physically located under passing metal, it is important to properly replenish the composition in order to maintain the effectiveness of the coating process. The ingredients comprising the composition are depleted as a result of reactions which occur during the formation of the coating. Available fluoride is consumed as a result of complexing with metal (i.e., a "used" coating bath may contain from about 0.005 to about 20 grams/liter or higher of metal ion), while acidity is consumed as the metal surface is coated.

The coating solution should be replenished if the ingredients are depleted. This may be accomplished by monitoring the amount of each ingredient in the coating solution and adding this ingredient as it is depleted. Alternatively, the replenishment can be accomplished by estimating the depletion and adding to the coating bath a predetermined amount of the ingredients at a predetermined time.

The methods and compositions of this invention can be applied in a wide variety of applications. These applications include extrusion applications and coil coating. An extrusion process is an operation in which a material is forced through a metal forming die, followed by cooling or chemical hardening. In coil coating, a roll of metal is unwound, sequentially and continuously cleaned, treated and decorated (i.e., painted and baked). Painted stock is rewrapped and then used to create articles. Articles formed from this preprinted coil obviously do not require further painting and baking. Thus, a convenient and economic means for producing articles is achieved. It has been found that polymer reactants of slightly higher molecular weight are preferred for a coil coating application than those for an extrusion process.

Because the prepainted coil must be cut, bent, impacted, and shaped into a desired article, the adhesion of the paint to a metal is important. Measures of the paint adhesion include T-bends, impact, crosshatch, crosshatch reverse impact, nickel scratch resistance, pencil hardness, 100 MEK double rub test, and fingernail scratch test.

Further, corrosion resistance is important because an article produced from painted coil can be required to perform in severe weather. Articles such as siding and rainwear (e.g., gutters and spouts) are some examples. Corrosion performance specifications for these types of articles include boiling water, condensing humidity, neutral salt spray, and mildew resistance.

EXAMPLES

The following examples are included to more clearly demonstrate the overall nature of the invention. These examples are exemplary, not restrictive, of the invention.

In the examples below, reference is made to various performance tests. These tests are used to assess how well a pretreatment serves to improve paint adhesion and corrosion resistance. In the nickel scratch resistance test, an edge of a nickel is used to cut into cured paint on a metal surface. If the paint is removed in one continuos ribbon, then the paint is considered to exhibit poor nickel adhesion (labeled "POOR" below). If the paint is removed only with difficulty and the resulting paint ribbon is discontinuous, then the paint exhibits good nickel adhesion (labeled "OK" below). If hardly any of the paint is removed, the paint exhibits excellent nickel adhesion (labeled "EXC" below).

Also discussed below is the pencil hardness test, which is disclosed in ASTM designation D 3363-92a. The pencil hardness test is a measure of the cured paint system's hardness. This test involves attempting to scratch the paint with progressively harder pencil leads. A score of "H" means that the system is harder than a score of "F." The following is the full scale of the pencil hardness test:

softer end: 6B-5B-4B-3B-2B-B-HB-F-H-2H-3H-4H-5H-6H: harder end.

The 100 MEK double rub test is also referenced below. That test involves rubbing a painted sample 100 times with a cloth saturated with methyl ethyl ketone, as disclosed in ASTM designation D 5402. The sample is then examined for dissolved paint. A result of $100^+$ means that the painted sample was rubbed 100 times (back and forth) and still did not show any indication of paint removal.

The fingernail scratch test is also referenced below. This test is a subjective test and involves scratching the cured metal surface with a fingernail and assessing how much and how easily paint was removed. The test results range from poor, acceptable (labeled "OK" below), and excellent (labeled "EXC" below).

The Neutral Salt Spray test involves exposing a painted metal sample to atomized salt spray (at 5% salt). The samples are scored with an "X" and are analyzed for paint loss. The test results range from poor, acceptable (labeled "OK" below), and excellent (labeled "EXC" below).

Example 1

A chromium-free pretreatment composition of U.S. patent application Ser. No. 08/112,890 containing polyvinyl alcohol, polyacrylic acid, and ammonium zirconium carbonate, gave unacceptable results when used to treat cold-rolled steel in a coil coating process when used with only a single coat of a particular paint. The problem was characterized by poor nickel scratch resistance. Variations in concentration and coating weights, as well as an increase in bake temperature, did not improve the nickel scratch resistance of the applied paint. In addition, a fluoacid-based system (in place of ammonium zirconium carbonate) was attempted and also failed to provide adequate nickel scratch resistance. The samples also had a pencil hardness of typically softer than HB. Although most of the samples passed the MEK double rub test, achieving a score of $100^+$ double rubs, the paint was becoming peelable in some cases after 100 double rubs.

A composition of the present invention was then used to treat cold-rolled steel. In particular, silica sold under the trademark CABOSPERSE A-205® was combined with the following components in thefollowing amounts:

TABLE 3

| Compound | % Wt. |
| --- | --- |
| Deionized Water | 33.04 |
| Aqueous Solution of Ammonium Zirconium Carbonate (at 9.24 weight % in water) | 25.00 |
| CABOSPERSE A-205 ® silica | 16.96 |
| A 1.46 weight % PVA, 2.28 weight % PAA aqueous solution | 25.00 |

CABOSPERSE A-205® silica uses ammonium as a stabilizer counter-ion and has a negative particle charge. The average particle diameter is typically 100–165 nms. CABOSPERSE A-205® silica contains 12 weight percent silica (as $SiO_2$) and has a pH of from about 5 to 6.5 at 25° C.

When the composition of Table 3 was prepared, it was found to be stable (i.e., the silica did not react). A sample treated in the same manner as before, except that the composition of the pretreatment was that of Table 3, gave excellent properties. Specifically, the sample had good nickel scratch resistance, a pencil hardness of H-2, and an MEK double rub rating of $100^+$, with no indication that the paint was becoming peelable.

Example 2

In order to meet color matching requirements of a particular acrylic paint, an operator of a coil coating line used lower oven bake temperatures than required to achieve a fully baked film. As a result, the pencil hardness of the finished paint coil was lower than desired. The resulting metal samples showed poor resistance to stacking, i.e., stacking finished pieces on each other caused the paint to be scratched too readily. The samples exhibited poor nickel scratch resistance.

As a response to this problem, addition of silica to the pretreatment solutions was effected. Two compositions representative of the pretreatment described in U.S. patent application Ser. No. 08/112,390 now abandoned, were first formulated. These compositions are shown below in Tables 4 and 5.

TABLE 4

| Compound | % Wt. |
| --- | --- |
| Deionized Water | 95.21 |
| A 60 weight % fluotitanic acid solution | 2.47 |
| Ammonium hydroxide | 1.40 |
| PVA | 0.36 |
| PAA | 0.56 |

TABLE 5

| Compound | % Wt. |
| --- | --- |
| Deionized Water | 33.04 |
| Aqueous Solution of Ammonium Zirconium Carbonate (at 9.24 weight % in water) | 25.00 |
| CABOSPERSE A-205 ® silica | 16.96 |
| A 1.46 weight % PVA, 2.28 weight % PAA aqueous solution | 25.00 |

Added to the compositions of Tables 4 and 5 were varying amounts of silica, either as CABOSPERSE A-205® or LUDOX AS-40®. LUDOX AS-40® silica uses ammonium as the stabilizer counter-ion and has a negative particle charge. The average particle diameter is typically 22 nms. LUDOX AS-40® silica is approximately 40 weight percent silica (as $SiO_2$) and has a pH of about 9.1 at 25° C.

Various compositions representative of the present invention were used to treat metal surfaces, and painted samples were subjected to the pencil hardness, nickel scratch, fingernail scratch, and neutral salt spray tests. Shown below in Tables 6–9 are the results of how four different samples performed in tests along with the various weight percent of added silica (as $SiO_2$), calculated on dry weight basis.

TABLE 6

CABOSPERSE ® silica and Composition of Table 4

| Actual % Wt. $SiO_2$ | PH | Ni SCRH | F.SCRH | N.S.S. |
| --- | --- | --- | --- | --- |
| — | H | POOR | POOR | EXC |
| 23.73 | HB | POOR | POOR | EXC |
| 38.95 | H | OK | OK | EXC |
| 57.39 | H | EXC | EXC | EXC |
| 75.19 | H | OK | OK | EXC |

TABLE 7

LUDOX ® silica and Composition of Table 4

| Actual % Wt. $SiO_2$ | PH | Ni SCRH | F.SCRH | N.S.S. |
| --- | --- | --- | --- | --- |
| — | H | POOR | POOR | EXC |
| 25.26 | HB | POOR | POOR | EXC |
| 42.69 | 2H | OK | OK | EXC |
| 64.17 | H | EXC | EXC | EXC |
| 88.07 | H | EXC | EXC | EXC |

TABLE 8

CABOSPERSE ® silica and Composition of Table 5

| Actual % Wt. $SiO_2$ | PH | Ni SCRH | F.SCRH | N.S.S. |
| --- | --- | --- | --- | --- |
| — | H | POOR | POOR | EXC |
| 19.95 | HB | POOR | POOR | EXC |
| 35.04 | H | POOR | POOR | OK |
| 51.89 | H | OK | OK | EXC |
| 70.82 | H | EXC | EXC | EXC |

TABLE 9

LUDOX ® silica and Composition of Table 5

| Actual % Wt. $SiO_2$ | PH | Ni SCRH | F.SCRH | N.S.S. |
| --- | --- | --- | --- | --- |
| — | H | POOR | POOR | EXC |
| 21.30 | H | OK | POOR | EXC |
| 37.37 | H | OK | OK | OK |
| 58.93 | H | EXC | EXC | OK |
| 85.54 | F | EXC | EXC | POOR |

It should also be noted that the samples in the bottom rows (containing the greatest amount of silica) of Tables 7 and 9 exhibited some corrosion along the roll marks in the neutral salt spray test.

As can be seen, without the addition of any silica, all samples performed poorly in the nickel scratch and fingernail scratch tests. When a particular amount of silica was added, however, the samples performed much better in the nickel scratch and fingernail scratch tests. Typically, samples performed better with increasing silica content in the nickel scratch and fingernail scratch tests, although Tables 6–9 indicate upper threshold limits of silica content for best performance. Furthermore, the presence of silica did not significantly degrade the samples' performances in the neutral salt spray test. Also, the inclusion of silica did not significantly affect the pencil hardness ratings.

As a comparison, a non-silica sample and a silica-containing sample of pretreatments sold by others were tested. The results are shown below in Table 10. Sample 1 is a composition sold under the trademark NUPAL by PPG Chemfil, and Sample 2 (the silica-containing sample) is a composition sold under the trademark BONDERITE by Parker & Amchem.

TABLE 10

LUDOX ® silica and Composition of Table 5

| Sample No. | PH | Ni SCRH | F.SCRH | N.S.S. |
| --- | --- | --- | --- | --- |
| 1 | HB | POOR | POOR | OK |
| 2 | H | EXC | EXC | POOR |

As observed from Table 10, both samples performed poorly in at least one of the four tests. In particular, sample 1 performed poorly in the nickel scratch and fingernail scratch tests, and sample 2 performed poorly in the neutral salt spray test. On the other hand, by observing Tables 6–9, several of the samples of the present invention performed acceptably or excellently in all of the tests.

Although this invention has been described with reference to specific embodiments, it is not necessarily limited to those embodiments. Accordingly, the appended claims should be construed to encompass not only those forms and embodiments of the invention specifically described above, but such other forms and embodiments as may be devised by those skilled in the art without departing from the true spirit and scope of the invention.

What is claimed:

1. A composition for treating a metal surface to improve paint adhesion and corrosion resistance, said composition comprising:

an aqueous solution comprising water and:
- a) a blend of polyvinyl alcohol and a second polymer having a plurality of carboxylic functional groups; and
- b) an additive selected from the group consisting of at least one of:
  - i) an acid of a group IV-B element and a weak base; and
  - ii) an ammonium salt of a group IV-B compound; and
- c) hydrofluoric acid; and inert silica dispersed throughout said solution and added in an amount of from about 40 to about 70 percent solids, calculated on a dry weight basis.

2. A composition in accordance with claim 1, wherein:

said additive consists of an ammonium salt of a group IV-B compound, wherein said ammonium salt is ammonium zirconium carbonate.

3. A composition in accordance with claim 2, wherein said solution has a pH of at least about 4.

4. A composition in accordance with claim 1, wherein:

said additive consists of an acid of a group IV-B element and a weak base, wherein said acid of a group IV-B element is fluotitanic acid and said weak base is ammonium hydroxide.

5. A composition in accordance with claim 4, wherein said solution has a pH of from about 3 to about 4.5.

6. A composition in accordance with claim 1, wherein said inert silica is added in an amount of from about 50 to about 65 percent solids, calculated on a dry weight basis.

7. A method for treating a metal surface to improve paint adhesion and corrosion resistance, said method comprising contacting said metal surface with a composition comprising:

an aqueous solution comprising water and:
- a) a blend of polyvinyl alcohol and a second polymer having a plurality of carboxylic functional groups; and
- b) an additive selected from the group consisting of at least one of:
  - i) an acid of a group IV-B element and a weak base; and
  - ii) an ammonium salt of a group IV-B compound; and
- c) hydrofluoric acid; and inert silica dispersed throughout said solution and added in an amount of from about 40 to about 70 percent solids, calculated on a dry weight basis.

8. A method in accordance with claim 7, wherein said additive consists of an ammonium salt of a group IV-B compound, wherein said ammonium salt is ammonium zirconium carbonate.

9. A method in accordance with claim 8, wherein said solution has a pH of at least about 4.

10. A method in accordance with claim 7, wherein:

said additive consists of an acid of a group IV-B element and a weak base, wherein said acid of a group IV-B element is fluotitanic acid and said weak base is ammonium hydroxide.

11. A method in accordance with claim 10, wherein said solution has a pH of from about 3 to about 4.5.

12. A method in accordance with claim 7, wherein said inert silica is added in an amount of from about 50 to about 65 percent solids, calculated on a dry weight basis.

* * * * *